(12) United States Patent
Efrati et al.

(10) Patent No.: US 9,179,482 B2
(45) Date of Patent: Nov. 3, 2015

(54) SYSTEMS AND METHODS FOR RAPID SETUP OF TELEPHONY COMMUNICATIONS

(71) Applicant: VONAGE NETWORK, LLC, Holmdel, NJ (US)

(72) Inventors: Tzahi Efrati, Givataim (IL); Baruch Sterman, Efrat (IL)

(73) Assignee: VONAGE NETWORK, LLC, Holmdel, NJ (US)

( * ) Notice: Subject to any disclaimer, the term of this patent is extended or adjusted under 35 U.S.C. 154(b) by 0 days.

(21) Appl. No.: 13/835,906

(22) Filed: Mar. 15, 2013

(65) Prior Publication Data
US 2014/0269498 A1    Sep. 18, 2014

(51) Int. Cl.
*H04W 76/02* (2009.01)

(52) U.S. Cl.
CPC .................................... *H04W 76/02* (2013.01)

(58) Field of Classification Search
CPC .................................................. H04W 76/02
USPC ......... 370/230, 240, 328, 331, 354, 356, 389, 370/395.54, 401
See application file for complete search history.

(56) References Cited

U.S. PATENT DOCUMENTS

| | | | |
|---|---|---|---|
| 6,404,746 B1 * | 6/2002 | Cave et al. ..................... 370/262 |
| 7,016,675 B1 * | 3/2006 | Schuster et al. .............. 455/433 |
| 7,082,301 B2 * | 7/2006 | Jagadeesan et al. .......... 455/436 |
| 7,126,939 B2 * | 10/2006 | Barany et al. ................ 370/352 |
| 7,206,582 B2 * | 4/2007 | Tom et al. ..................... 455/445 |
| 7,403,544 B2 * | 7/2008 | Thermond .................... 370/477 |
| 7,424,008 B2 * | 9/2008 | Thermond .................... 370/352 |
| 7,496,360 B2 * | 2/2009 | Sindhwani et al. ........ 455/422.1 |
| 7,502,615 B2 * | 3/2009 | Wilhoite et al. .............. 455/442 |
| 7,570,630 B1 * | 8/2009 | Phillips et al. ................ 370/352 |
| 8,223,720 B1 | 7/2012 | Efrati et al. |
| 8,433,371 B2 * | 4/2013 | Silver et al. .................. 455/567 |
| 8,537,770 B2 * | 9/2013 | Silver ........................... 370/329 |
| 8,725,148 B2 * | 5/2014 | George et al. ................ 455/436 |
| 2004/0266426 A1 | 12/2004 | Marsh et al. |
| 2005/0130650 A1 * | 6/2005 | Creamer et al. ........... 455/432.1 |
| 2005/0148362 A1 * | 7/2005 | Jagadeesan et al. .......... 455/555 |
| 2005/0190721 A1 * | 9/2005 | Pershan ........................ 370/328 |
| 2005/0238000 A1 * | 10/2005 | Pollock et al. ............... 370/352 |
| 2006/0050720 A1 * | 3/2006 | Zaitsu .......................... 370/401 |

(Continued)

OTHER PUBLICATIONS

International Search Report and Written Opinion mailed Jul. 23, 2014 for Application PCT/US2014/024184, 15 pages.

(Continued)

*Primary Examiner* — Andrew Lai
*Assistant Examiner* — Andrew C Lee
(74) *Attorney, Agent, or Firm* — Nixon & Vanderhye P.C.; Joseph Pagnotta (57) ABSTRACT

When an incoming communication is directed to a telephony device that is capable of conducting an IP-based communication via an IP telephony system and a cellular-based communication via a mobile telephony service provider, the communication is initially setup as a cellular-based communication via the mobile telephony service provider. At the same time, an IP-based communication channel is setup between the telephony device and an IP telephony system. Once the IP-based communication channel is available, the communication is transitioned from the cellular-based communication channel to the IP-based communication channel.

12 Claims, 6 Drawing Sheets

(56) References Cited

U.S. PATENT DOCUMENTS

| | | | |
|---|---|---|---|
| 2006/0077965 A1* | 4/2006 | Garcia-Martin et al. | 370/352 |
| 2006/0095515 A1* | 5/2006 | Forstadius | 709/205 |
| 2006/0116127 A1* | 6/2006 | Wilhoite et al. | 455/442 |
| 2006/0209794 A1* | 9/2006 | Bae et al. | 370/352 |
| 2007/0022289 A1* | 1/2007 | Alt et al. | 713/168 |
| 2007/0030843 A1* | 2/2007 | Miller et al. | 370/352 |
| 2007/0106799 A1* | 5/2007 | Jansson | 709/227 |
| 2007/0127400 A1* | 6/2007 | McKibben et al. | 370/260 |
| 2007/0147343 A1* | 6/2007 | Sasaki et al. | 370/352 |
| 2007/0201451 A1* | 8/2007 | Bennett | 370/356 |
| 2008/0037534 A1* | 2/2008 | Shina | 370/389 |
| 2008/0127232 A1* | 5/2008 | Langen et al. | 719/328 |
| 2008/0247381 A1* | 10/2008 | Bohm et al. | 370/352 |
| 2009/0003576 A1* | 1/2009 | Singh et al. | 379/202.01 |
| 2009/0067399 A1* | 3/2009 | McConnell et al. | 370/338 |
| 2009/0168757 A1 | 7/2009 | Bush | |
| 2009/0203375 A1 | 8/2009 | Gisby | |
| 2010/0081428 A1* | 4/2010 | Maejima et al. | 455/426.1 |
| 2010/0165070 A1 | 7/2010 | Goffin | |
| 2010/0189099 A1* | 7/2010 | Bae et al. | 370/352 |
| 2010/0195641 A1 | 8/2010 | Tsai | |
| 2011/0149955 A1 | 6/2011 | Petillo et al. | |
| 2012/0320908 A1* | 12/2012 | Silver et al. | 370/352 |
| 2013/0003703 A1* | 1/2013 | Todd et al. | 370/331 |

OTHER PUBLICATIONS

Nov. 19, 2014 Office Action issued in U.S. Appl. No. 13/836,406.
Oct. 3, 2014 Office Action issued in U.S. Appl. No. 13/837,042.
Jul. 23, 2015 Notice of Allowance issued in U.S. Appl. No. 13/836,406.
May 21, 2015 Office Action issued in U.S. Appl. No. 13/837,042.

* cited by examiner

SYSTEMS AND METHODS FOR RAPID SETUP OF TELEPHONY COMMUNICATIONS

BACKGROUND OF THE INVENTION

The invention is related to Internet Protocol (IP) telephony systems. More specifically, the invention is related to systems and methods for terminating a communication to a telephony device that is capable of conducting both an IP-based communication over a data network and a cellular-based communication via a mobile telephony service provider.

Before a telephony device can receive an incoming communication from an IP telephony system via a data network, the telephony device must register with the IP telephony system. During the registration process, the telephony device informs the IP telephony system of the IP address at which it can be reached.

Unfortunately, many telephony devices do not maintain a constant connection with an IP telephony system from which they can receive calls. For example, an IP telephony software application that is used by a smartphone to communication with an IP telephony system must typically be actively running on the device in order for the software application to maintain a connection to the IP telephony system. If the software application is not running, no connection will exist between the telephony device and the IP telephony system, and it will be impossible for the IP telephony system to route an incoming communication to the telephony device.

There are ways, however, for an IP telephony system to cause a telephony device to begin running an IP telephony software application. Typically, as soon as the software application is run, it registers with the IP telephony system. One common way is for the IP telephony system to cause a push notification to be sent to the telephony device. When the push notification is received by the telephony device, the mere receipt of the push notification may be enough to cause the IP telephony software application to run. Alternatively, the push notification may cause a query to be displayed to the user. If the user responds in an affirmative fashion, the IP software application will be run. If not, the software application is not run.

When an IP telephony system receives an incoming communication that is directed to a telephony device having an IP telephony software application, the IP telephony system usually first checks to see if the IP telephony software application on the telephony device is registered. If so, the communication can be immediately routed to the IP telephony software application. If not, the IP telephony system causes a push notification to be sent to the telephony device, to thereby cause the IP telephony software application on the telephony to begin running, and to register with the IP telephony system. Once the IP telephony software application has registered with the IP telephony system, the incoming communication can be routed to the IP telephony software application on the telephony device.

Unfortunately, performing all these steps can take a significant amount of time. If the incoming communication is an incoming call from a calling party, the calling party may become tired of waiting for the call to connect and may terminate the call attempt. Alternatively, the calling party may assume that the long delay means that an error has occurred, and the calling party will terminate the call attempt, even though the process described above is still in progress. Basically, any time that there is a significant delay in setting up a communication to the called telephony device, there is a chance that the calling party will prematurely terminate the setup attempt. Thus, there is a need for alternate procedures which can be used by IP telephony systems to quickly setup a communication to a telephony device so that the calling party will not prematurely terminate a communication setup attempt.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
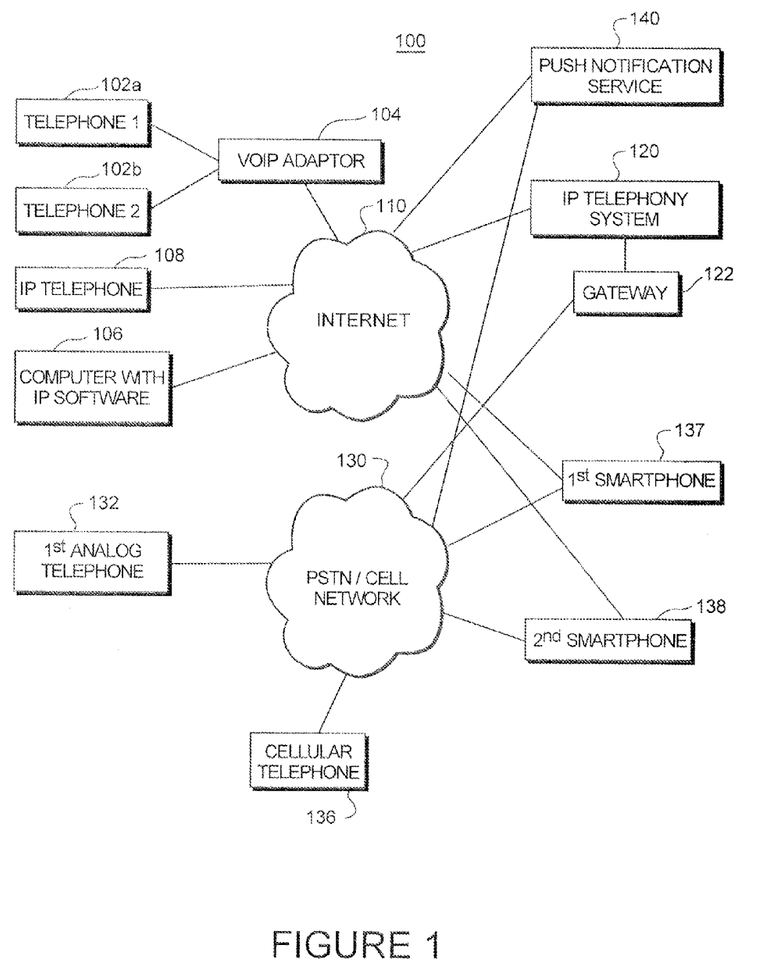
FIG. 1 is a diagram of a communications environment including various elements which are associated with an Internet protocol (IP) telephony system in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to a publicly switched telephone network (PSTN) or cellular network 130 via one or more gateways 122.

The gateway 122 allows users and devices that are connected to the PSTN or cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a data channel provided by a cellular telephone system 130 to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephones 102*a* and 102*b* could all be coupled to the same telephone adaptor 104. Analog telephony devices include, but are not limited to, standard telephones and document imaging devices such as facsimile machines. A configuration using a telephone adapter 104 is common where all of the analog telephones 102*a*, 102*b* are located in a residence or business, and all of the analog telephony devices are connected to the same telephone adapter. With this configuration, all of the analog telephones 102*a*, 102*b* share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 136 could also place a call to an IP telephony system 120 customer, and the connection would be established in a similar manner, although the first link would involve communications between the cellular telephone 136 and a cellular telephone network. For purposes of this explanation, the cellular telephone network is considered part of the first PSTN 130.

In addition, mobile computing devices which include cellular telephone capabilities could also be used to place telephone calls to customers of the IP telephony system 120. For example, both a first smartphone 137 and a second smartphone 138 have cellular telephony capabilities so that they can conduct cellular-based communications via the cellular network 130. The first smartphone 137 and second smartphone 138 also have the ability to run an IP telephony software application that can conduct IP-based communications through the IP telephony system 120, via data communications which pass over the Internet 110. The first smartphone 137 and second smartphone 138 are capable of establishing a data network connection for this purpose. For example, the first smartphone 137 and second smartphone 138 may be capable of communicating with a WiFi router or some other wireless data access point which provides access to the Internet 110. The first smartphone 137 and second smartphone 138 may also be capable of establishing a data connection to the Internet 110 via a data channel provided by the cellular network 130, such as a 3G or 4G data connection. Of course, alternate embodiments could utilize any other form of wired or wireless communications path to enable communications.

Users of the IP telephony system 120 are able to access the service from virtually any location where they can connect to the Internet 110. Thus, a customer could register with an IP telephony system in the U.S., and that customer could then use an IP telephone 108 located in a country outside the U.S. to access the services. Likewise, the customer could also utilize a computer outside the U.S. that is running a soft-phone client to access the first IP telephony system 120.

Further, in some instances a user could place a telephone call with the analog telephone 132 or the cellular telephone 136 that is routed through the PSTN 130 to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 130.

FIG. 1 also illustrates a push notification service 140. The push notification service 140 is capable of delivering push notifications to telephony devices for various purposes. A push notification may be delivered to a telephony device via a data network connection to the telephony device, such as via the Internet 110. Alternatively, a push notification could be delivered to a telephony device via a cellular network 130.

One example of a push notification service 140 is the Apple Push Notification Service (APNS), which is presently designed to send messages to at least the Apple iPhone™, the Apple iPad™ and the Apple iPod Touch™ devices. The push notifications are rigidly formatted messages that can be received by such devices anytime they are running and connected to either the Internet or a cellular data network.

Although the APNS is an example of a push notification service, this example should not be considered limiting. Other push notification services that have different message formats and different capabilities could also be used.

The Apple Push Notification Service allows an application that is installed on an Apple device such as the Apple iPhone™ to complete a registration process that results in the application receiving a device token. The device token uniquely identifies the mobile device itself. The application on the mobile device then provides this token to the service provider that created the application on the mobile device.

Once the service provider has possession of the token associated with a mobile device, the service provider can cause the APNS to send push notifications to the mobile device. A request for a push notification that is sent from the service provider to the APNS would include the device token, and information about the type of push notification that is to be sent to the mobile device.

When the APNS receives a push notification request from a service provider, it uses the information in the request to create a formatted push notification that it then delivers to the mobile device. The push notification can cause the mobile device to take several different actions. For example, a push notification can cause the mobile device to update a number displayed on a badge associated with the service provider's application. The number usually indicates that new information is available to the application, and the number may indicate the quantity of the new information. When a user sees a number on an application badge, the user can press the badge to load and run the application, which usually results in the application requesting and obtaining the new information that is waiting A push notification can also cause a notification message to be displayed on the mobile device. The notification message will usually include two buttons that the user can press. One button, usually labeled as "DISMISS," allows the user to dismiss the notification message. If the user presses this button, the notification message will no longer be displayed, and no further action will be taken by the mobile device.

However, if the user pushes the other button, which is usually labeled as "VIEW," the mobile device will load and run the application on the mobile device that is associated with the service provider that caused the push notification to be sent.

In other configurations, when a push notification is received by a mobile device, the mobile device simply automatically loads and runs a particular application associated with the push notification, without waiting for user intervention.

As explained above, a push notification message is typically associated with a particular application that is resident on a mobile device. In some instances, the application may already be running on the mobile device when a push notification message associated with the application is received. In this situation, the push notification message is passed along to the application, either automatically, or only after the user grants permission for the message to be passed along.

When a service provider requests that a notification message be sent to a mobile device, the service provider can specify the text that is presented to the user as part of the notification message displayed on the mobile device. The wording to be displayed is part of the push notification request that is sent from the service provider to the APNS. And the APNS uses this information to format the push notification that is then delivered to the mobile device.

In the context of the present invention, the IP telephony system 120 may have provided an IP telephony software application which is loaded on the first smartphone 137 or the second smartphone 138. Once the applications are registered with the push notification service 140, the IP telephony system 120 is capable of causing the push notification service 140 to send push notifications to the first smartphone 137 and the second smartphone 138. Such a push notification can trigger the smartphone to load and run the IP telephony software application provided by the IP telephony system 120. Thus, in turn, will cause the IP telephony software application to register with the IP telephony system 120 so that the IP telephony system 120 can route incoming communications to the smartphone.

Figure 2:
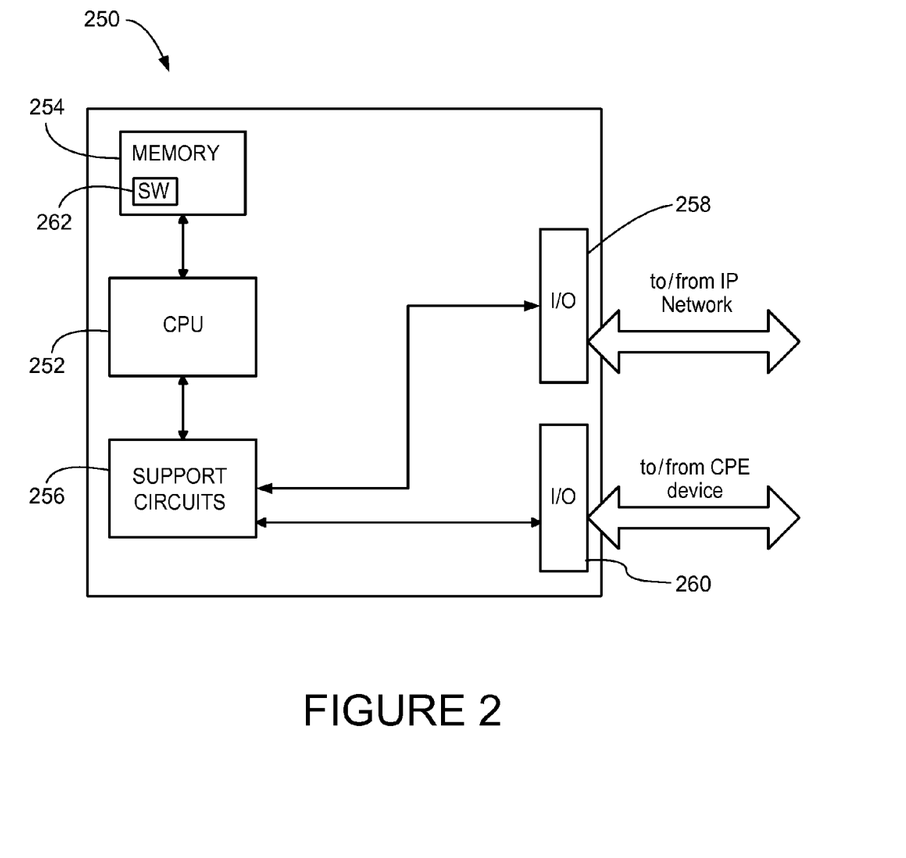
FIG. 2 is a diagram of various elements of a processor that forms part of an IP telephony system or an IP telephony device according to an embodiment of the invention.

FIG. 2 illustrates elements of a computer processor 250 that can be used as part of the IP telephony system 120 or a telephony device to accomplish various functions. The IP telephony system 120 could include multiple processors 250 located at various locations in the system, along with their operating components and programming, each carrying out a specific or dedicated portion of the functions performed by the IP telephony system 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to conduct a communication. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

The following description will also refer to telephony communications and telephony activity. These terms are intended to encompass all types of telephone communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
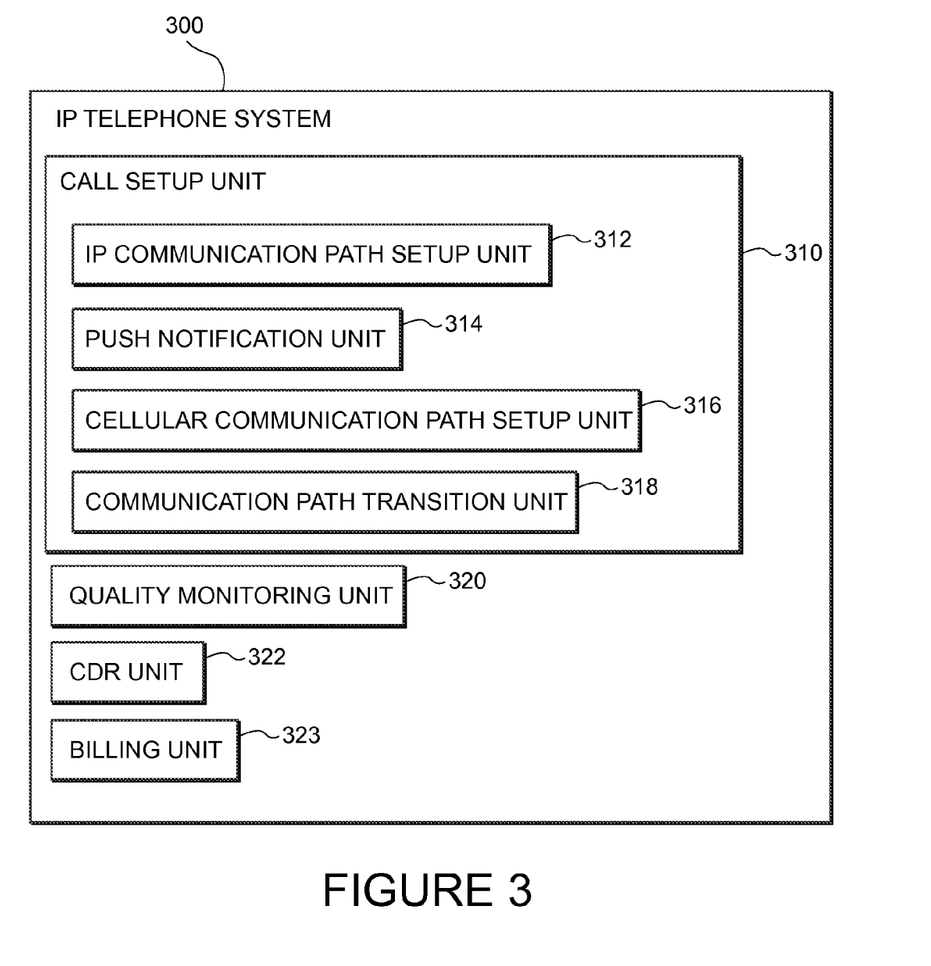
FIG. 3 is block diagram illustrating various elements of an IP telephony system according to an embodiment of the invention.

FIG. 3 illustrates selected elements of an IP telephony system 300 according to one embodiment of the invention. As shown in FIG. 3, the IP telephony system 300 includes a call setup unit 310. The call setup unit 310 includes an IP communication path setup unit 312, a cellular communication path setup unit 316, and a communication path transition unit 318. The call setup unit 310 also includes a push notification unit 314 which instructs a push notification service to send a push notification to a particular telephony device.

The IP telephony system 300 also includes a quality monitoring unit 320 which is responsible for monitoring the quality of telephony communications which are being conducted by user telephony devices. The IP telephony system also includes a CDR unit 322 which receives call detail records relating to telephony communications passing through the IP telephony system 300. The IP telephony system 300 further includes a billing unit 323 which utilizes information from the CDR unit 322 in order to bill for the communications handled by the IP telephony system 300. The way in which these elements of the IP telephony system operate to perform methods embodying the invention will be described in detail below.

Figure 4:
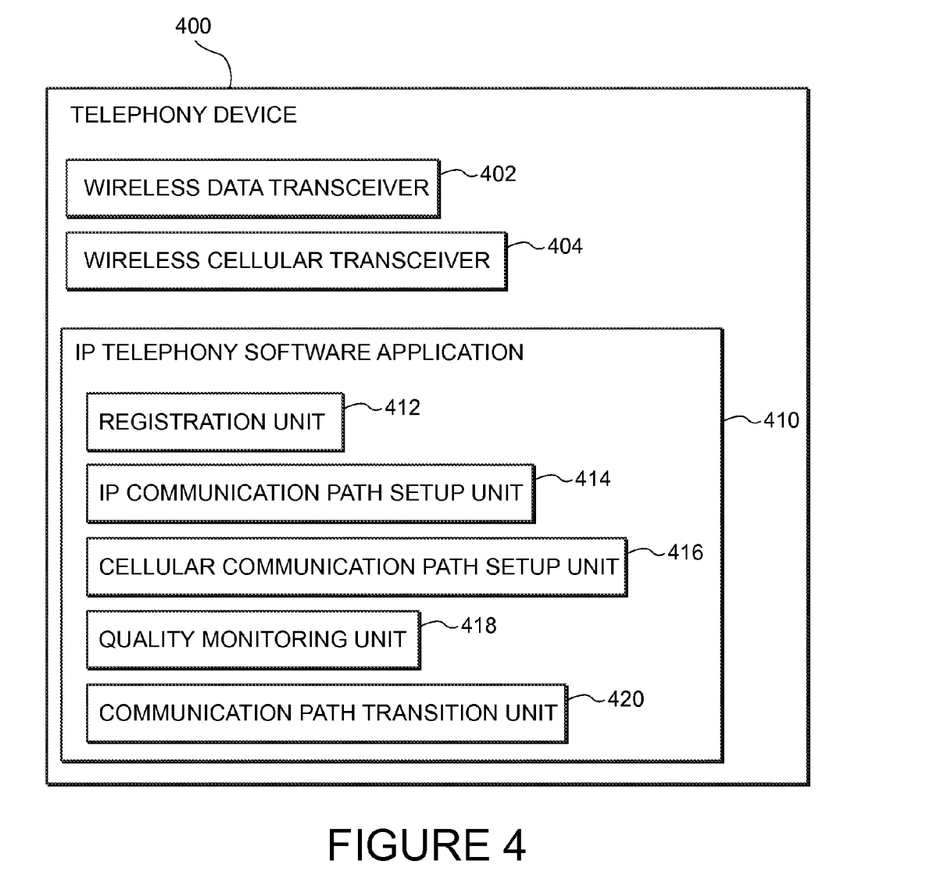
FIG. 4 is a block diagram of various elements of a telephony device according to an embodiment of the invention.

FIG. 4 illustrates a user telephony device 400 in accordance with one embodiment of the invention. The telephony device 400 includes a wireless data transceiver 402 which is capable of communicating data packets with a wireless access point that provides the telephony device 400 with access to a data network. The wireless data transceiver 402 would send and receive data packets that are used to establish and conduct IP based telephony communications.

The telephony device 400 also includes a wireless cellular transceiver 404 which is capable of communicating with elements of a cellular telephony system. The wireless cellular transceiver could communicate in various different communication protocols with elements of the cellular telephony system in order to conduct voice or video telephony communications. The wireless cellular transceiver 404 may also be capable of communicating data packets through a data channel of the cellular telephony system that provides access to a data network, such as the Internet. This would allow the telephony device 400 to conduct an IP based telephony communication through a data channel provided by the cellular telephony system.

The telephony device 400 also includes an IP telephony software application 410. The IP telephony software application 410 is used to set up and conduct IP telephony communications with an IP telephony system, such as the one illustrated in FIG. 3. The IP telephony software application 410 may also be capable of directing or controlling the setup and cancellation of cellular based communications.

The IP telephony software application 410 includes a registration unit 412 that is responsible for registering with an IP telephony system. During the registration process, the IP telephony software application informs the IP telephony system of an IP address at which the telephony device 400 can be reached. This allows the IP telephony system to route IP based communications to the telephony device 400.

The IP telephony software application 410 also includes an IP communication path setup unit 414 which is capable of establishing an IP based communication path with an IP telephony system. The IP based communication path could be established through a data network using the wireless data transceiver 402 and/or the wireless cellular transceiver 404. The IP telephony software application 410 also includes a cellular communication path setup unit 416 which is capable of establishing a cellular based communication path utilizing the wireless cellular transceiver 404.

The IP telephony software application 410 also includes a quality monitoring unit 418. The quality monitoring unit 418 monitors data packet delivery statistics, such as packet loss, latency, and jitter, as a way of monitoring the quality of an IP telephony communication. The quality monitoring unit 418 may also measure or detect the quality of IP telephony communications in various other ways. Further, the quality monitoring unit 418 may directly interact with the user of the telephony device 400 to receive input regarding the quality of IP telephony communications.

The quality monitoring unit 418 may also monitor a strength of a wireless connection established by the wireless data transceiver 402 to a wireless access point which provides access to a data network. The quality monitoring unit 418 may further monitor a strength of a wireless connection established between the wireless cellular transceiver 404 and one or more elements of a cellular telephony system. The quality monitoring unit 418 could utilize native elements of the telephony device 400 in order to determine the strength of those wireless connections.

The IP telephony software application 410 further includes a communications path transition unit 420. The communications path transition unit 420 is responsible for transitioning an ongoing telephony communication between a cellular based communication path and an IP based communication path.

The way in which elements of the IP telephony system 300 and a telephony device 400 interact to perform various function in accordance with the invention will now be described with reference to the flowcharts in FIGS. 5 and 6.

As explained in the Background section above, when an IP telephony system 300 receives an incoming communication directed to a telephony device 400 with an IP telephony software application 410, the IP telephony system 300 checks to see if the IP telephony software application 410 is presently registered. If so, the call setup unit 310 terminates the communication to the IP telephony software application 410 on the telephony device. More specifically, the IP communication path setup unit 312 interacts with the IP communication path setup unit 414 in the IP telephony software application 410 to setup an IP based communication path that is then used to conduct the communication.

However, if the IP telephony software application 410 on the telephony device 400 is not registered with the IP telephony system 300, the communication cannot be immediately terminated to the IP telephony software application 410. Instead, it is necessary to take steps to cause the IP telephony software application to begin running, and to register with the IP telephony system 300. One way for this to occur is for the push notification unit 314 to cause a push notification service 140 (as shown in FIG. 1) to send a push notification to the telephony device 400. The push notification causes the telephony device to load and run the IP telephony software application 410. At which point the registration unit 412 registers with the IP telephony system 300 so that the communication can be terminated to the IP telephony software application. But if this process takes too long, the calling party may prematurely terminate the communication setup attempt.

Figure 5:
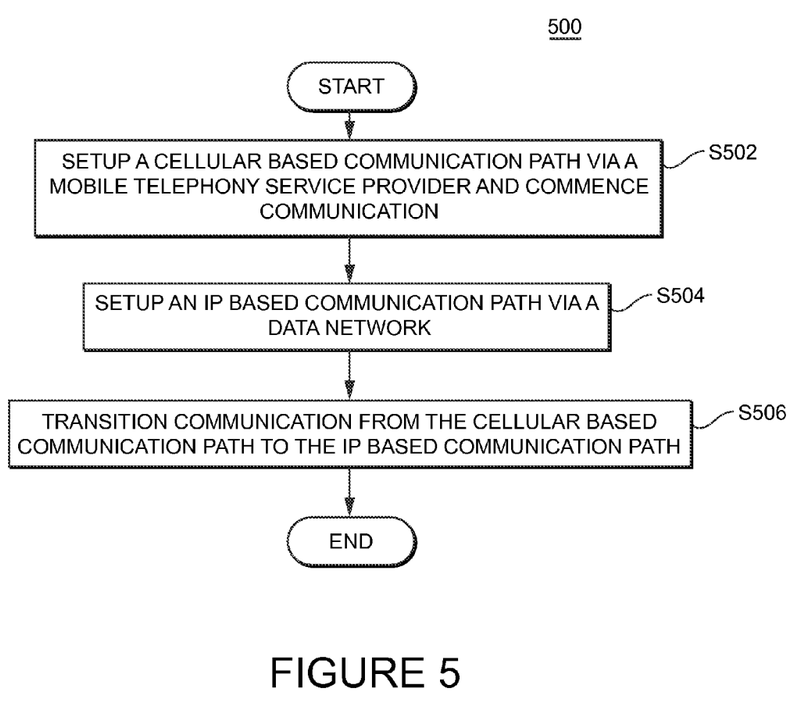
FIG. 5 is flowchart illustrating steps of a first method according to the invention.

FIG. 5 illustrates steps of a method 500 that can be performed to more quickly setup the communication to the telephony device 400, to thereby help prevent a calling party from prematurely abandoning the communication setup attempt. The method 500 begins and proceeds to step S502, where the cellular communication path setup unit 316 of the IP telephony system 300 sets up a cellular based communication path to the telephony device 400. This cellular based communication path could be a cellular based telephone call that is placed by the cellular communication path setup unit 316 to the telephony device 400 via a mobile telephony service provider, such as a cellular telephony system. In some instances, native elements of the telephony device will be fully responsible for answering this incoming cellular based call. In other instances, a cellular communication path setup unit 416 of the IP telephony software application 410 on the telephony device 400 may be involved in setting up the cellular based communication path. The communication then commences on this cellular based communication path.

By commencing the communication over the cellular based communication path, the communication can start very rapidly. In most cases, if the IP telephony software application 410 on the telephony device 400 is not already running and registered with the IP telephony system 300 when the incoming communication is received by the IP telephony system 300, the communication can be started much more quickly over a cellular based communication path than by following all the steps necessary to setup the communication over an IP based communication path.

Next, in step S504, an IP based communication path is established between the IP telephony system 300 and the IP telephony software application 410 on the telephony device 400. As explained above, this often requires that the push notification unit 314 instruct a push notification service 140 to send a push notification to the telephony device 400 to cause the telephony device 400 to load and run the IP telephony software application 410. When the IP telephony software application begins running, the registration unit 412 conducts a registration process. After which, the IP communication path setup unit 312 of the IP telephony system 300 and the IP communication path setup unit 414 on the telephony device 400 can interact to setup the IP based communication path via a data network.

The IP based communication path could be setup using the wireless data transceiver 402 of the telephony device. Alternatively, the wireless cellular transceiver 404 could be used to access a data channel provided by a mobile telephony service provider, and the data channel could be used to setup the IP based communication channel.

Next, in step S506, the communication is transitioned from the cellular based communication path to the IP based communication path. This could be accomplished by the communication path transition unit 318 of the IP telephony system 300 and/or by the communication path transition unit 420 of the IP telephony software application 410 on the telephony device 400. For example, in some embodiments, the communication traversing the cellular based communication path could be conferenced together with a separate IP based communication traversing the IP based communication path, and then the cellular based communication path could be terminated. Of course, the transition from the cellular based communication path to the IP based communication path could be accomplished in various other ways. The method then ends.

With a method as illustrated in FIG. 5, and described above, a communication can be established very quickly to prevent a calling party from prematurely terminating a communication setup attempt. Also, while the communication is being setup over a cellular based communication path, the IP telephony system can take steps to activate an IP telephony software application on the telephony device so that the call can later be transitioned to an IP based communication path. As soon as the IP based communication path is available, the communication can be transitioned to the IP based communication path, which will likely be lower cost.

In the method described above, the push notification unit 314 causes a push notification service to send a push notification to the telephony device 400 to cause the telephony device 400 to load and run the IP telephony software application 410. That push notification could take many different forms.

In some instances, simply receiving the push notification may cause the telephony device 400 to load and run the IP telephony software application 410. In other instances, the push notification may cause a message to be displayed or played to the user asking if the user wishes to receive an incoming call via the IP telephony software application 410. If the user responds negatively, the IP telephony software application 410 would not be run. If the user responds affirmatively, the IP telephony software application 410 is loaded and run, and the method described above continues so that the communication can be transitioned to the IP based communication path.

The type of push notification that is sent to the IP telephony device 400 may be controlled and varied by the push notification unit 314 based on various considerations. For example, some users may specify that when the IP telephony system 300 has received an incoming call that is to be terminated to the telephony device 400, the push notification unit 314 should cause a push notification to be sent that causes the IP telephony software application 410 to be automatically loaded and run. Other users may specify that the push notification should give them the option as to whether the IP telephony software application 410 should be loaded and run. Thus, the push notification may send different types of push notifications to different users, based on their stated preferences.

In alternate embodiments of the invention, it may not be necessary for a push notification to be sent to the telephony device 400 in order for the IP telephony software application 410 to be loaded and run. For example, the telephony device 400 may be configured such that anytime the telephony device 400 receives an incoming cellular based call from a specified originating telephone number, the telephony device 400 is to load and run the IP telephony software application 410. In this instance, the originating telephone number is the telephone number of the IP telephony system 300 which is placing the cellular based call to terminate an incoming communication to the telephony device 400.

When a telephony device 400 is configured in this fashion, each time that a cellular based call is received, the telephony device 400 examines caller ID information that is included in the call setup signaling, and the caller ID information is compared to one or more predetermined originating identifiers. If there is a match, the telephony device knows to load and run the IP telephony software application 410. This eliminates the need for a push notification to be sent. And as will be explained below, this can be quite advantageous in some circumstances.

In the method described above in connection with FIG. 5, once the IP telephony software application 410 is loaded and running, and it registers with the IP telephony system 300, an IP based communication path is automatically setup, and the communication which starts on the cellular based communication path is automatically transitioned to the IP based communication path. In alternate embodiments, these steps may not all be performed automatically.

For example, in one alternate embodiment, once the IP telephony software application 410 has been loaded and is running, and it has registered with the IP telephony system 300, the quality monitoring unit 320 of the IP telephony system 300, and/or a quality monitoring unit 418 which is part of the IP telephony software application 410,4 may perform checks to determine a strength or quality of an IP based communication path that is established between the IP telephony software application 410 and the IP telephony system 300. This could include a check of data packet delivery statistics, and/or checks of a strength of a wireless connection that the telephony device 400 has established through the wireless data transceiver 402 or the wireless cellular transceiver 404. A decision is then made as to whether the strength and/or quality of the IP based communication path is sufficient to support a quality communication over the IP based communication path. If so, the transition is performed. If not, the communication may continue over first cellular based communication path.

In still other embodiments, the IP telephony software application 410 may play or display a query to the user of the telephony device 400 asking if the user wishes for the communication to be transitioned to an IP based communication path. That query could include information about an anticipated strength or quality of the IP based communication path, to help the user to decide whether to agree to have the communication transitioned to the IP based communication path. The user would then make a choice, and the communication would either continue on the cellular based communication path or be transitioned to the IP based communication path in accordance with user's wishes.

Figure 6:
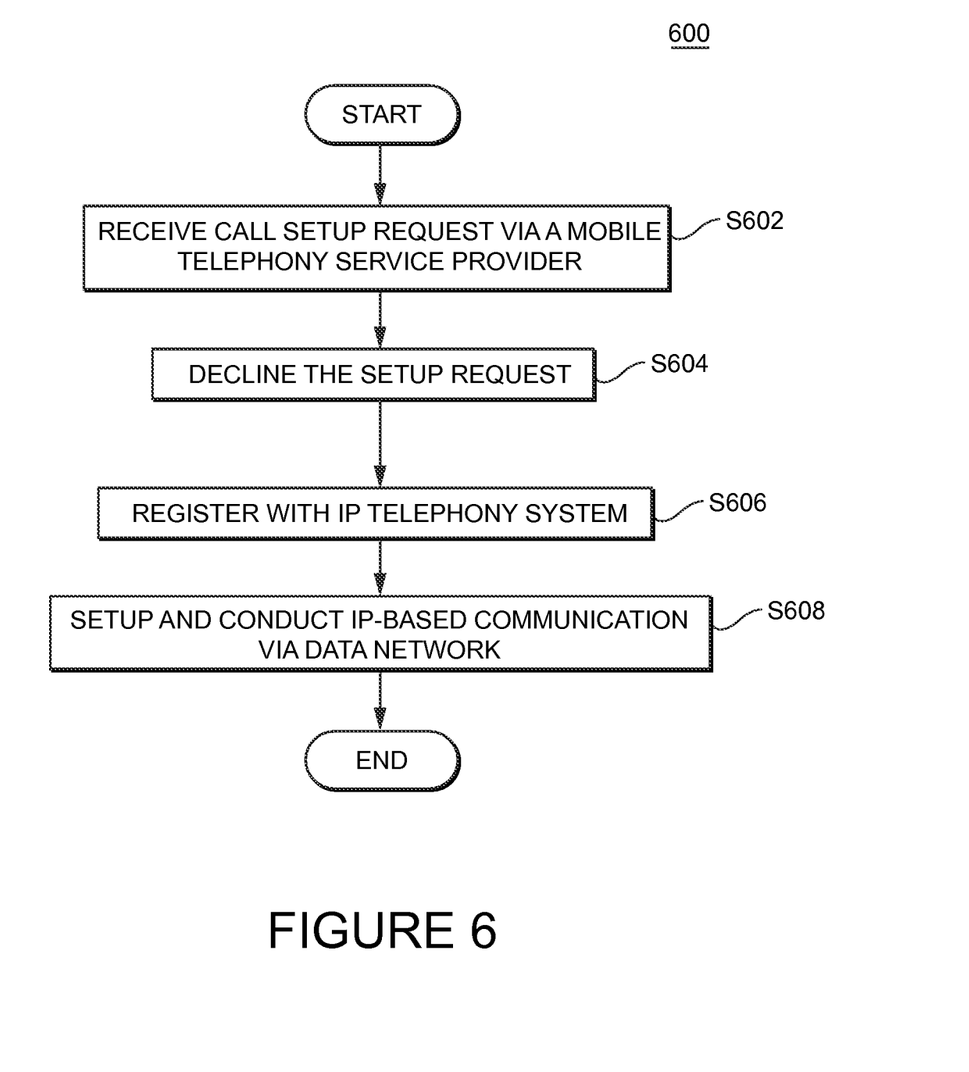
FIG. 6 is a flowchart illustrating steps of a second method according to an embodiment of the invention.

FIG. 6 illustrates an alternate method embodying the invention which can also be performed by the IP telephony system 300 and the telephony device 400. This method could be particularly advantageous where the telephony device is a mobile telephony device that is roaming, and where the user wishes to avoid being charged high roaming fees for conducting a cellular based communication outside the user's native service area.

In this method, the telephony device 400 is configured such that if the telephony device 400 receives an incoming call setup request over a cellular network, and the incoming call includes caller ID information that matches one or more predetermined originating identifiers, then the telephony device is to decline the call, but also load and run the IP telephony software application 410.

The method 600 illustrated in FIG. 6 is performed when the IP telephony system 300 receives an incoming communication directed to the telephony device 400. The IP telephony system 300 initially tries to setup the communication via a cellular based communication path, as described above. This means the IP telephony system 300 places a call to the telephony device 400 over a cellular network.

The method 600 begins and proceeds to step S602, where the telephony device 400 receives the call setup request from the IP telephony system 300 via a cellular network. In step S604, the telephony device 400 declines the call setup request. Next, in step S606, the telephony device 400 causes the IP telephony software application 410 to be loaded and run, and the IP telephony software application 410 registers with the IP telephony system 300. The method then proceeds to step S608, where an IP based communication path is established between the IP telephony system 300 and the IP telephony software application 410, so that the communication can be terminated to the telephony device 400 over the IP based communication path.

Although a method as illustrated in FIG. 6, and described above, will not result in faster setup of the communication, the method can ensure that the communication is ultimately established, even when the telephony device 400 is roaming outside its native service area. In many cases, when a telephony device 400 is outside its native service area, push notification are not delivered to the device. As a result, it is impossible to cause an IP telephony software application on the telephony device to loaded and run using a push notification. However, a local mobile telephony service provider can send a cellular call to the telephony device. By using the incoming cellular call setup request as the trigger for loading and running the IP telephony software application, one can enable the telephony device to receive an incoming communication from the IP telephony system without the use of a push notification. Moreover, if the telephony device is configured to decline the cellular call setup request that acts as the trigger for loading and running the IP telephony software application, the user will not have to pay to receive a cellular communication while roaming.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by one or more processors of an IP telephony system for setting up a telephony communication, the method comprising:

setting up a first cellular-based communication path via a mobile telephony service provider to a telephony device that is capable of simultaneously conducting an Internet protocol (IP) communication via a data network and a cellular-based communication via a mobile telephony service provider, and commencing a telephony communication with the telephony device over the first communication path;

sending a communication to the telephony device that causes an IP software application on the telephony device to register with the IP telephony system via a data network;

setting up a second IP-based communication path to the telephony device via the data network; and transitioning the telephony communication from the first communication path to the second communication path, wherein the transitioning comprises:

conferencing together the first cellular-based communication path and the second IP-based communication path; and terminating the first cellular-based communication path such that the telephony communication continues over only the second IP-based communication path.

2. The method of claim 1, wherein setting up the first communication path and commencing the telephony communication over the first communication path comprises placing a call to a native identifier of the telephony device via the mobile telephony service provider.

3. The method of claim 1, wherein sending a communication to the telephony device comprises causing a push notification to be sent to the telephony device.

4. The method of claim 1, wherein sending a communication to the telephony device comprises causing a predetermined identifier to be included in caller ID information that is sent to the telephony device when the first communication path is setup to the telephony device via the mobile telephony service provider.

5. A system for setting up a telephony communication with a telephony device, comprising:
   means for setting up a first cellular-based communication path via a mobile telephony service provider to a telephony device that is capable of conducting an Internet protocol (IP) communication via a data network and a cellular-based communication via a mobile telephony service provider, and commencing a telephony communication with the telephony device over the first communication path;
   means for sending a communication to the telephony device that causes an IP software application on the telephony device to register with an IP telephony system via a data network;
   means for setting up a second IP-based communication path to the telephony device via the data network; and
   means for transitioning the telephony communication from the first communication path to the second communication path, wherein the transitioning means conferences together the first cellular-based communication path and the second IP-based communication path, and then terminates the first cellular-based communication path such that the telephony communication continues over only the second IP-based communication path.

6. A system for setting up telephony communication with a telephony device, comprising:
   a cellular communication path setup unit including at least one processor that sets up a first cellular-based communication path via a mobile telephony service to a telephony device that is capable of condcting an Internet protocol (IP) communication via a data network and a cellular-based communication via a mobile telephony service provider, and the commences a telephony communication with the telephony device over the first communication path;
   an IP communication path setup unit that sends a communication to the telephony device that causes an IP software application on the telephony device to register with an IP telephony system via a data network, and that sets up a second IP-based communication path to the telephony device via the data network; and
   a communication path transition unit that transitions the telephony communication from the first communication path to the second communication path, wherein the communication path transition unit conferences together the first cellular-based communication path and the second IP-based communication path, and then terminates the first cellular-based communication path such that the telephony communication continues over only the second IP-based communication path.

7. The system of claim 6, wherein the cellular communication path setup unit places a call to a native identifer of the telephony device via the mobile telephony service provider.

8. The system of claim 6, wherein the IP communication path setup unit causes a push notification to be sent to the telephony device.

9. The system of claim 6, wherein the IP communication path setup unit setup unit causes an IP software application on the telephony device to register with the IP telephony system by causing a predetermined identifier to be included in caller ID information that is sent to the telephony device when the cellular communication path setup unit causes the first communication path to be setup to the telephony device via the mobile telephony service provider.

10. A method performed by one or more processors of an IP telephony system for setting up a telephony communication with a telephony device, the method comprising:
   setting up a first cellular-based communication path via a mobile telephony service provider to a telephony device that is capable of conducting an Internet protocol (IP) communication via a data network and a cellular-based communication via a mobile telephony service provider, and commencing a telephony communication with the telephony device over the first communication path;
   setting up a second IP-based communication path to the telephony device via a data network by:
   causing an IP software application on the telephony device to register with the IP telephony system via the data network by either causing a push notification to be sent to the telephony device or causing a predetermined identifier to be included in caller ID information that is sent to the telephony device when the first communication path is setup to the telephony device via the mobile telephony service provider, and
   setting up an IP based communication with the telephony device via the data network; and
   transitioning the telephony communication from the first communication path to the second communication path.

11. The method of claim 10, wherein causing an IP software application on the telephony device to register with the IP telephony system comprises causing a push notification to be sent to the telephony device.

12. The method of claim 10, wherein causing an IP software application on the telephony device to register with the IP telephony system comprises causing a predetermined identifier to be included in caller ID information that is sent to the telephony device when the first communication path is setup to the telephony device via the mobile telephony service provider.

* * * * *